US006568182B2

(12) United States Patent
Linden et al.

(10) Patent No.: US 6,568,182 B2
(45) Date of Patent: May 27, 2003

(54) ELECTRONICALLY CONTROLLABLE BRAKE BOOSTER

(75) Inventors: Christoph Linden, Vallendar (DE); Lorenz Maack, Stuttgart (DE)

(73) Assignees: Lucas Industries plc (GB); Daimler-Chrysler AG (DE)

( * ) Notice: Subject to any disclaimer, the term of this patent is extended or adjusted under 35 U.S.C. 154(b) by 0 days.

(21) Appl. No.: 09/882,592

(22) Filed: Jun. 15, 2001

(65) Prior Publication Data

US 2002/0006341 A1 Jan. 17, 2002

Related U.S. Application Data

(63) Continuation of application No. PCT/EP99/10013, filed on Dec. 16, 1999.

(30) Foreign Application Priority Data

Dec. 18, 1998 (DE) .......................... 198 58 649

(51) Int. Cl.$^7$ .............................. F15B 7/08; F15B 13/16
(52) U.S. Cl. ........................... 60/545; 60/547.1; 91/367
(58) Field of Search ..................... 91/367, 376 R; 60/545, 547.1

(56) References Cited

U.S. PATENT DOCUMENTS

| 3,765,172 A | | 10/1973 | Fineman |
| 3,795,426 A | * | 3/1974 | Sisson ....................... 91/376 R |
| 6,006,648 A | * | 12/1999 | Eckert ......................... 91/367 |
| 6,048,039 A | | 4/2000 | Eckert |
| 6,185,498 B1 | | 2/2001 | Linden et al. |
| 6,209,968 B1 | | 4/2001 | Bayens et al. |

FOREIGN PATENT DOCUMENTS

| DE | 2209091 A1 | 9/1972 |
| DE | 19527493 A1 | 1/1997 |
| DE | 19744054 C1 | 10/1998 |
| DE | 19744111 C1 | 10/1998 |
| WO | WO96/30239 | 10/1996 |
| WO | WO97/48585 | 12/1997 |

* cited by examiner

Primary Examiner—F. Daniel Lopez
(74) Attorney, Agent, or Firm—MacMillan, Sobanski & Todd, LLC

(57) ABSTRACT

Electronically controllable brake booster with a vacuum chamber and a pressure chamber, which are separated from one another by a moveable wall, a control valve arrangement, which can be actuated by means of an electromagnetic actuating device and via which a pressure difference between the pressure and the vacuum chamber can be set, wherein the control valve arrangement takes up a holding position, a pressure build-up position, a pressure reduction position in accordance with a current generated as correcting variable by an electronic control unit and flowing through the electromagnetic actuating device, a cylinder-piston arrangement, which is connected to the brake booster and comprises a piston, coupled to a brake pedal, of a hydraulic cylinder which has a hydraulic connection leading to a wheel brake, a sensor arrangement for detecting a signal which is correlated with the pressure of the hydraulic cylinder and which reproduces the controlled variable, wherein the electronic control unit establishes a command variable, taking account of the output signal of a sensor arrangement detecting the driver's braking requirement, and wherein the value of the correcting variable remains unchanged with respect to a value output directly beforehand if the control difference established from the command variable and the controlled variable does not deviate from a first predetermined tolerance range value.

8 Claims, 5 Drawing Sheets

ELECTRONICALLY CONTROLLABLE BRAKE BOOSTER

CROSS REFERENCE TO RELATED APPLICATIONS

This application is a continuation of International Application No. PCT/EP99/10013 filed Dec. 16, 1999, which claims priority to German Patent Application No. 19858649.3 filed Dec. 18, 1998.

BACKGROUND OF THE INVENTION

The present invention relates to an electronically controllable brake booster. The invention relates in particular to an electronically controllable brake booster with a vacuum chamber and a pressure chamber, which are separated from one another by a moveable wall. A control valve arrangement can be actuated by means of an electromagnetic actuating device. A pressure difference between the pressure and the vacuum chamber can be set via the control valve arrangement. The control valve arrangement takes up a holding position, a pressure buildup position or a pressure reduction position in accordance with a current generated as correcting variable by an electronic control unit and flowing through the electromagnetic actuating device. A cylinder-piston arrangement is connected to the brake booster, this arrangement comprising a piston, coupled to a brake pedal, of a hydraulic cylinder which has a hydraulic connection leading to a wheel brake. A sensor arrangement serves to detect a signal which is correlated with the pressure of the hydraulic cylinder and which reproduces the controlled variable. A brake booster of this kind is described, for example, in DE 19527 493 A1, which is incorporated by reference herein, together with a learning process for the operating point setting.

The brake booster illustrated above is operated in a closed loop. This ensures that the electromagnetic actuating device is largely prevented from overshooting or undershooting. The control characteristic is subject to a variation range in the region of the two sloping branches due to interference effects caused, for example, by friction losses upon the armature and the valve components coupled thereto moving, or by tolerances of the spring arrangement, or by fluctuations of external reaction forces, which include in particular fluctuations in the compressive force component in the vacuum chamber when using a brake booster. This proves to be particularly problematic for an accurate setting of the "holding position". If, for example, a change-over from "build-up" position to "holding position" is desired, it is possible for a change-over to occur immediately after "reduction position", which results in an abrupt pressure drop which may have serious consequences, especially where safety-critical applications are concerned, as in the case of an electronically controlled brake booster. In order to counter this problem, according to-the teaching of this prior art, when changing over to "holding position" a current I0 resulting as the arithmetic average value of the currents I1 and I2 is always set, as the arrangement is designed such that the lower limit of the variation range of the left-hand sloping branch and the upper limit of the variation range of the right-hand sloping branch do not overlap.

SUMMARY OF THE INVENTION

The present invention takes up the approach to a solution from DE 195 27 493 A1 and directly includes the driver's braking requirement in this concept. However the consideration of the pressure which is described in this prior art does not determine the object.

In order to solve this problem in a brake booster of the type initially described, a command variable is established by the electronic control unit, taking account of the output signal of a sensor arrangement detecting the driver's braking requirement, wherein the value of the correcting variable remains unchanged with respect to a value output directly beforehand if the control difference established from the command variable and the controlled variable does not deviate from a first predetermined tolerance range value.

The result of this measure is to "smooth" the actuation of the actuator without causing any impairment of the control quality.

In a preferred embodiment the value of the correcting variable remains unchanged with respect to a value output directly beforehand if a (the first or second) derivative of the control difference also does not deviate from a second predetermined tolerance range value. The control behaviour is also adapted to the dynamic behaviour of the overall arrangement by including the gradients of the control deviation.

Instead of using the derivative of the control difference, the value of the correcting variable may remain unchanged with respect to a value output directly beforehand if an intermediate variable established from a derivative of the command variable and a derivative of the controlled variable also does not deviate from a second predetermined tolerance range value.

In a preferred embodiment of the invention the control valve arrangement can be brought by a first current value of the correcting variable into the pressure build-up position, in which the connection between the vacuum chamber and the pressure chamber is blocked and the connection between the pressure chamber and the atmosphere is open, so that a pressure difference is built up or increased at the moveable wall, by a second current value of the correcting variable into the pressure holding position, in which the connection between the vacuum chamber and the pressure chamber is blocked and the connection between the pressure chamber and the atmosphere is blocked, so that a pressure difference acting at the moveable wall is maintained, or by a third current value of the correcting variable into the pressure reduction position, in which the connection between the vacuum chamber and the pressure chamber is open and the connection between the pressure chamber and the atmosphere is blocked, so that a pressure difference acting at the moveable wall is reduced by a pressure equalisation procedure.

According to the invention, the correcting variable assumes the first current value if the command variable is greater than the controlled variable, the second current value if the command variable is substantially equal to the controlled variable, and the third current value if the command variable is less than the controlled variable.

In a preferred embodiment of the invention an additional proportional and/or integral and/or differential controller serves to convert the control difference into an auxiliary correcting variable so as to superimpose this on the correcting variable, preferably in additive fashion In a development a linear transmission member with a dead zone may be connected upstream of the additional proportional and/or integral and/or differential controller.

BRIEF DESCRIPTION OF THE DRAWINGS

Further properties, advantages, features and possible variations of the invention are illustrated on the basis of the following description of a currently preferred embodiment of the invention with reference to the drawings, in which.

DETAILED DESCRIPTION OF THE INVENTION

Figure 1:
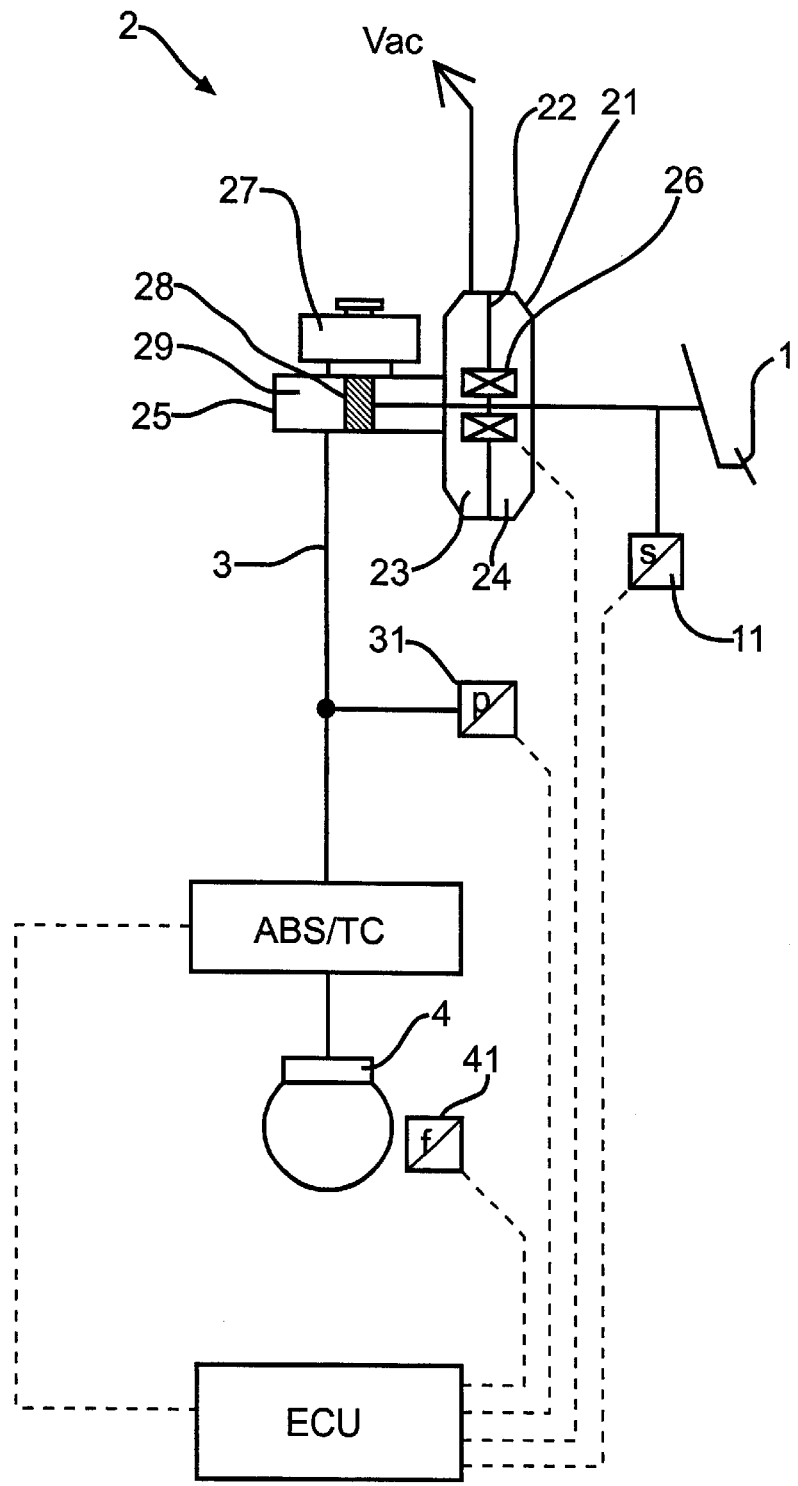
FIG. 1 shows in schematic form a vehicle brake system with an electronically controllable brake booster.

In the vehicle brake system represented schematically in FIG. 1 a brake pedal 1 serves to actuate a brake pressure transmitter unit 2 via an actuating element. The brake pressure transmitter unit 2 comprises a brake cylinder 25, in which a piston 28 defines a pressure chamber 29. The pressure chamber 29 is supplied with brake fluid from a reservoir 27. A brake line 3 leads from the pressure chamber 29 to a wheel brake 4 of the vehicle.

An anti-lock braking control device and/or traction control device ABS/TC is/are disposed in the brake line 3 between the brake pressure transmitter unit 2 and the wheel brake 4. The anti-lock braking control device and/or traction control device ABS/TC comprise(s) in a known manner, inter alia, valve and pump arrangements which are activated by an electronic control unit ECU in order to modulate the pressure in the wheel brake 4. This takes place in accordance with the rotational behaviour of a vehicle wheel which is associated with the wheel brake 4, this behaviour being detected by means of a sensor 41 and fed to the electronic control unit ECU.

The brake pressure transmitter unit 2 comprises a brake booster 21 in order to boost the actuating force introduced by the driver via the brake pedal 1. A moveable wall 22 divides the brake booster 21 into a vacuum chamber 23 and a pressure chamber 24. The vacuum chamber is connected to a vacuum source Vac, which is not shown in detail, in order to produce the vacuum. The vacuum which is produced in the intake pipe in accordance with the principle is available for this in a vehicle equipped with an Otto engine.

However a vehicle driven by a diesel engine or an electric motor requires an additional vacuum pump as vacuum source Vac. Upon actuating the brake pedal 1, the brake booster functions in a known manner through the admission of atmospheric pressure to the pressure chamber 24, so that a pressure difference, which assists the actuating force introduced at the brake pedal 1, acts at the moveable wall 22. In the non-actuated state the vacuum chamber 23 and the pressure chamber 24 are connected together and therefore pressure-equalised, so that no pressure difference acts at the moveable wall 22.

The brake booster 21 may also be controlled electronically through an electromagnet arrangement 26. The possibility of controlling the brake booster 21 electronically also enables braking to be executed automatically, i.e. independently of any actuation of the brake pedal 1. This may serve to execute, for example, anti-lock braking control, vehicle movement dynamics control or distance control. A sensor arrangement 11 is provided in order to detect variables which are related to the actuation of the brake pedal 1, such as, e.g. the pedal travel, the pedal force or the pedal actuation speed, for evaluation in the electronic control unit ECU in order also to brake in emergency situations, in which case, for example, a value exceeding a certain pedal actuation speed serves as criterion. A desired pressure signal pSOLL is generated as command variable in the electronic control unit ECU from the signal(s) of one or more sensor(s).

The electromagnet arrangement 26 actuates a control valve, which is not shown in detail here, in order to bring the brake booster 21 into different control positions (I., II., III.):

into a first so-called "build-up position" (I.), in which the connection between the vacuum chamber 23 and the pressure chamber 24 is blocked and the connection between the pressure chamber 24 and the atmosphere is open, so that a pressure difference is built up or increased at the moveable wall 22, or into a second so-called "holding position" (II.), in which the connection between the vacuum chamber 23 and the pressure chamber 24 is blocked and the connection between the pressure chamber 24 and the atmosphere is blocked, so that a pressure difference acting at the moveable wall 22 is maintained, or into a so-called "reduction position" (III.), in which the connection between the vacuum chamber 23 and the pressure chamber 24 is open and the connection between the pressure chamber 24 and the atmosphere is blocked, so that a pressure difference acting at the moveable wall 22 is reduced by a pressure equalisation procedure.

In order to bring the control valve into the different control positions (I., II., III.) for the purpose of modulating the pressure difference at the movable wall 22, the electronic control unit ECU passes a control current $I_{TARGET}$, which forms the correcting variable, through the electromagnet arrangement 26, with the variation in the control current $I_{TARGET}$ being effected, for example, by pulse width modulation. A magnetic force is in the process exerted on the armature of the electromagnet arrangement 26, which force brings the armature into a position to which the resulting control positions (I., II., III.) correspond.

The brake pressure $p_{ACTUAL}$ which is produced in the pressure chamber 29 of the brake cylinder 25 and introduced into the brake line 3 represents the controlled variable and is detected by means of a sensor 31 and transmitted to the electronic control unit ECU in order to control the brake pressure $p_{ACTUAL}$ in accordance with a desired pressure value and/or pressure variation $p_{TARGET}$ by adjusting the control current $I_{TARGET}$ flowing through the electromagnet arrangement 26.

Figure 2:
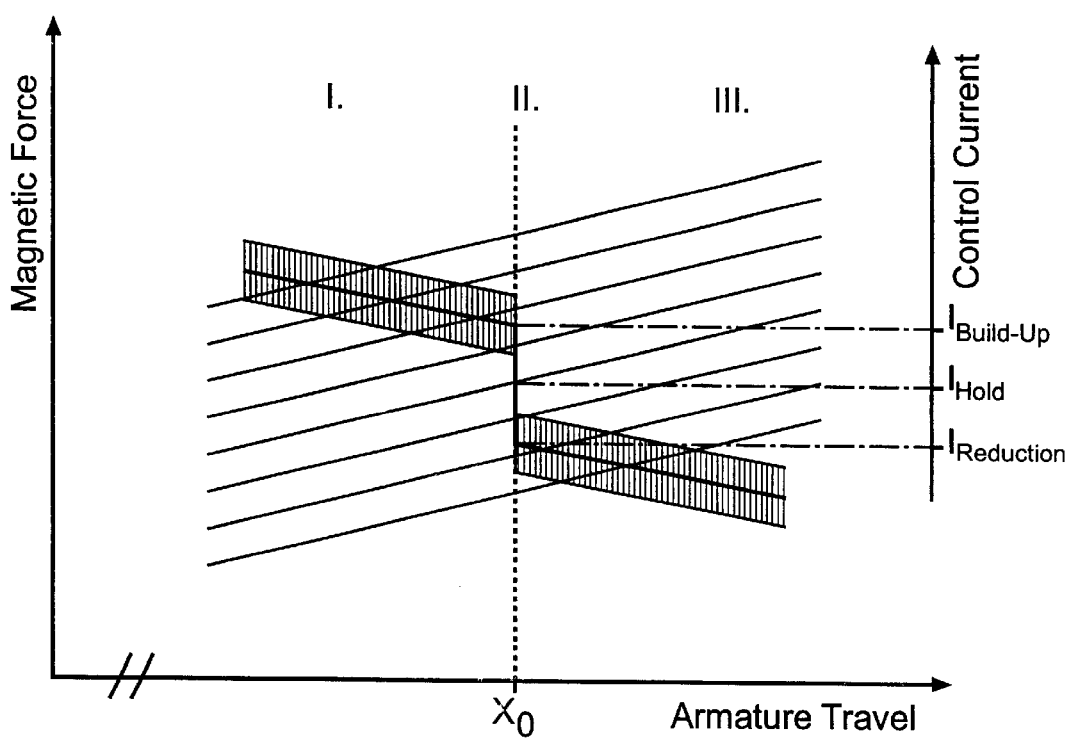
FIG. 2 shows in schematic form a graph for illustrating the control characteristic of an electronically controllable brake booster.

The travel is plotted along the abscissa and the magnetic force which is exerted on the armature of the electromagnet arrangement 26 and is produced in accordance with the control current $I_{TARGET}$ along the ordinate in the graph according to FIG. 2. This is an idealised schematic representation relating to an operating range which is designed such that there is a proportional interrelationship between magnetic force and control current. The control characteristic of the electronically controllable brake booster 21 is also plotted. This control characteristic has a total of three branches. A current range $I_{REDUCTION} < I_{TARGET} < I_{BUILD-UP}$ is associated with a certain armature position x0 in the case of the vertical branch, the position x0 corresponding exactly to the holding position (II.). The sloping branch adjoining the vertical branch to the left applies to a current $I_{TARGET} > I_{BUILD-UP}$ and represents the build-up position (I.), while the sloping branch extending from the vertical branch to the right applies to a current $I_{TARGET} < I_{REDUCTION}$ and characterises the reduction position (III.).

Due to interference effects caused by, for example, friction losses, tolerances, temperature fluctuations or fluctuations of external reaction forces, which include in particular fluctuations in the compressive force component in the vacuum chamber 23 of the brake booster 21, the control characteristic is subject to a variation range in the region of the sloping branches, which leads to a displacement of the operating points $I_{REDUCTION}$ and $I_{BUILD-UP}$. In order to counter this problem, a current resulting as the arithmetic average value of the currents $I_{REDUCTION}$ and $I_{BUILD-UP}$ is preferably set for $I_{HOLD}$. This and, in particular, a process for learning the currents $I_{REDUCTION}$ and $I_{BUILD-UP}$ determining the operating points are described in DE 195 27 493 A1.

Figure 3:
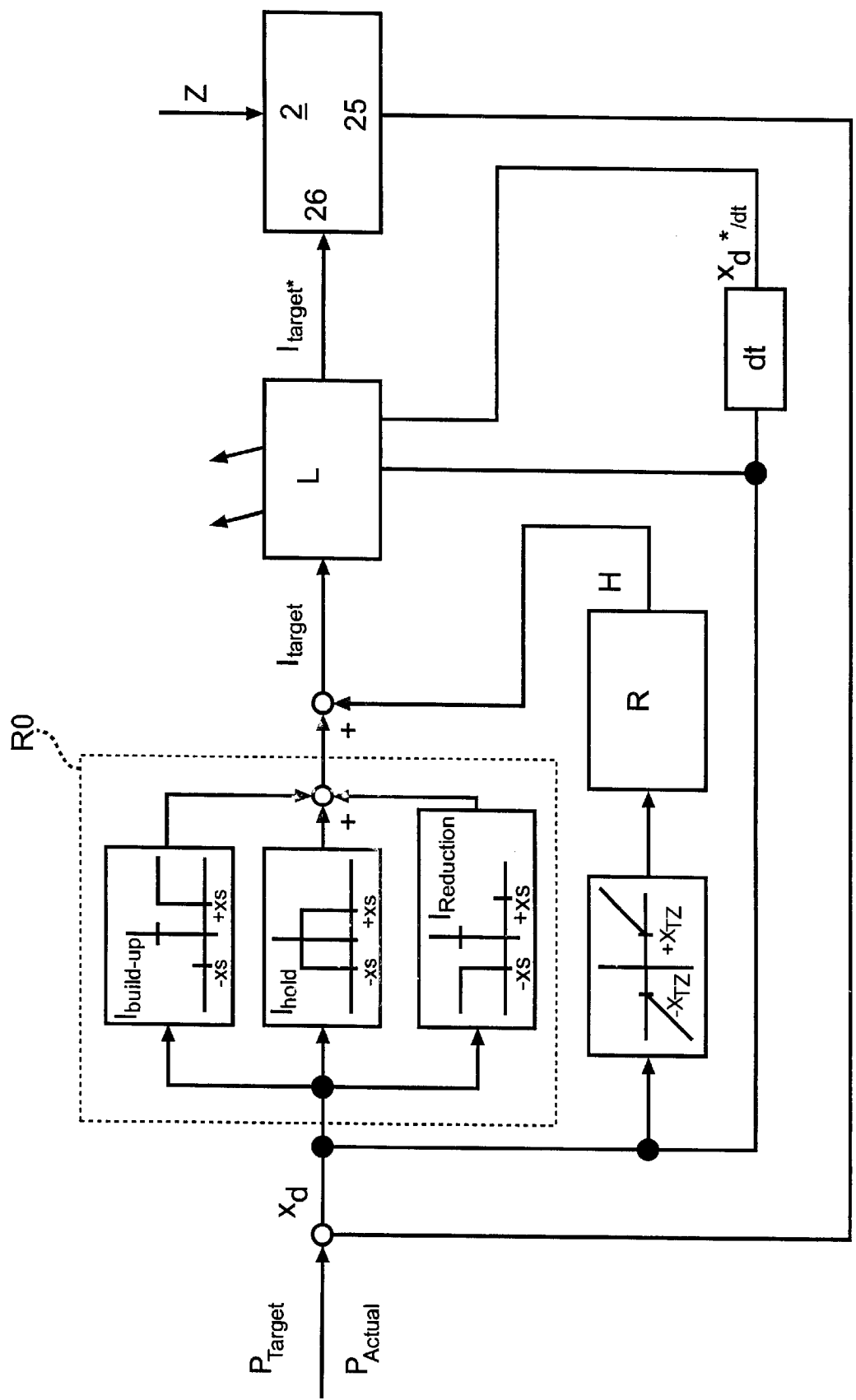
FIG. 3 shows in schematic form a loop for operating according to the invention an electronically controllable brake booster.

The operation of the electronically controllable brake booster 21 in a closed loop is represented in FIG. 3. Here a controlled variable, the brake pressure $p_{ACTUAL}$ produced in the brake cylinder 25, which originates from the controlled member, the brake pressure transmitter unit 2, is continuously detected and compared with a command variable, the desired pressure value $p_{TARGET}$. The result of this comparison is a control difference xd, which is fed to a control device. The correcting variable which is output by the control device is the control current $I_{TARGET}$ flowing through the electromagnet arrangement 26. The interference variables z are predominantly the above-mentioned effects caused by friction, tolerances, temperature and reaction forces.

The control device in the first place comprises a three-stage controller RO, which—in accordance with the control difference xd—initially carries out a "coarse setting or presetting" of the correcting variable $I_{TARGET}$, according to which $I_{TARGET}$ is set equal to $I_{BUILD-UP}$ if $p_{TARGET}$ is greater than $p_{ACTUAL}$, $I_{TARGET}$ is set equal to $I_{HOLD}$ if $p_{TARGET}$ is (substantially) equal to $p_{ACTUAL}$, $I_{TARGET}$ is set equal to $I_{REDUCTION}$ if $p_{TARGET}$ is less than $p_{ACTUAL}$.

The control difference xd is in each case compared with a threshold value xs according to the weighting functions represented in FIG. 3. The control device also comprises a controller R of the analogue or digital type which, for example, exhibits proportional and/or integral and/or differential control behaviour. The controller R is connected in parallel with the three-stage controller RO in order to carry out the "fine control" of the correcting variable $I_{TARGET}$. A linear transmission member with a dead zone TZ is connected upstream of the controller R, which is preferably in the form of a P1 controller. The dead zone TZ is dimensioned such that a control difference not exceeding the holding current is removed, while a control difference corresponding to the build-up or reduction current is fed unchanged to the controller R.

According to the invention a postprocessor L is connected between the control device RO, R and the controlled member 2. The postprocessor L adapts the correcting variable $I_{TARGET}$ to the dynamic behaviour of the command variable $p_{TARGET}$ and the controlled variable $p_{ACTUAL}$. For this purpose the gradient of the control difference is (continuously) established in order to (continuously) determine the deviation xd* thereof and process this in the postprocessor L. The correcting variable $I_{TARGET}$, which is available at the input side of the postprocessor L, is then adjusted in accordance with the deviation xd* and/or the control deviation xd, so that a correcting variable $I_{TARGET}^*$ adapted to the dynamic behaviour is output at the output side of the postprocessor L.

The control device RO, R and the postprocessor L are preferably constructed as a component part of the electronic control unit ECU. As the electronic control unit ECU is usually equipped with at least one microcomputer, the control device RO, R and the postprocessor L may easily be implemented in software—i.e. without any expenditure on circuitry.

Figure 4:
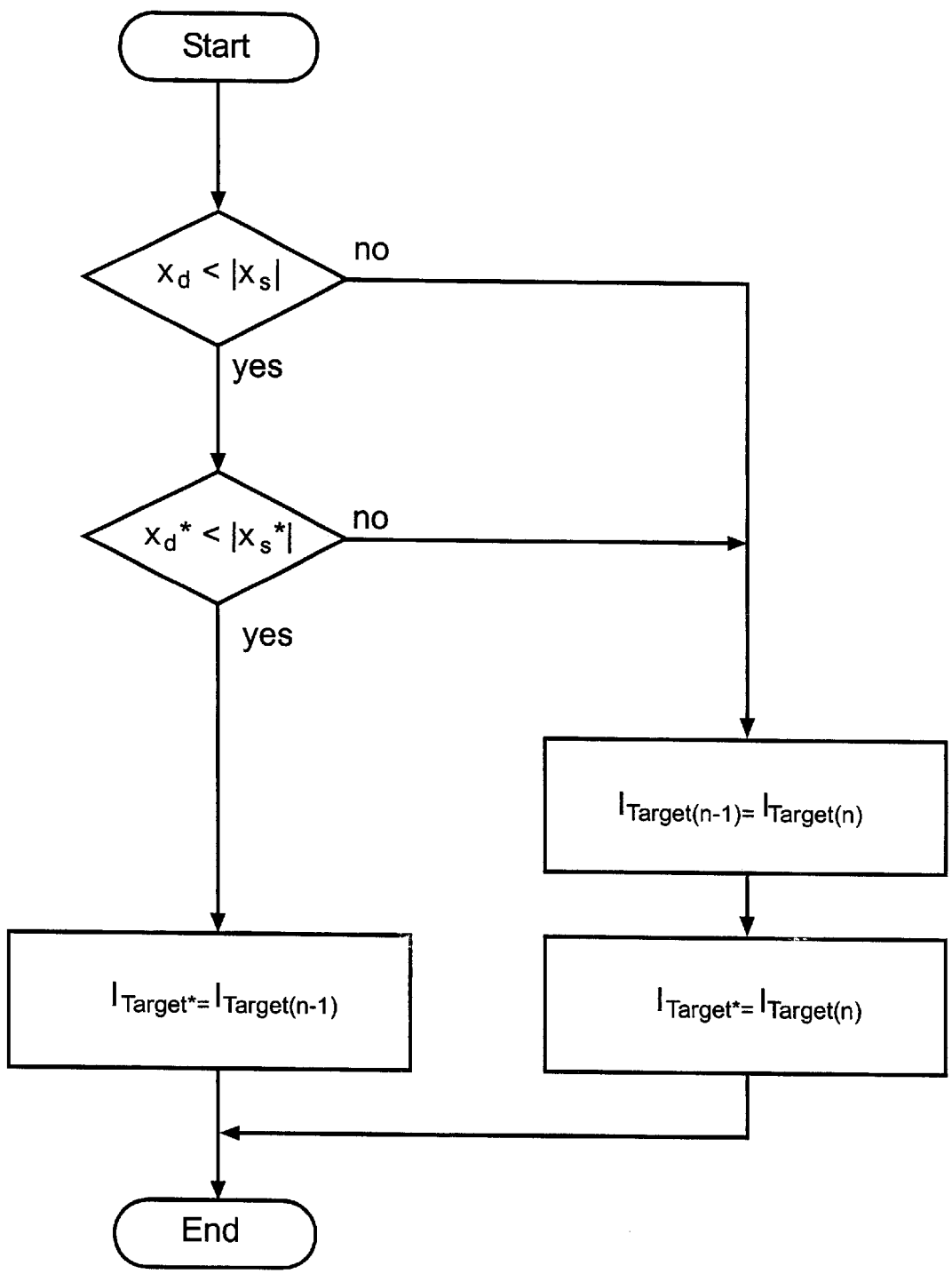
FIG. 4 shows in schematic form a flow diagram for illustrating the operation according to the invention of an electronically controllable brake booster.

FIG. 4 represents a possible implementation of the postprocessor L as a flow diagram. The sequence represented in the flow diagram is executed cyclically as follows:

The first-question to be asked is whether the control deviation xd is less than the threshold value xs.

The following question is whether the deviation xd* of the gradients $p_{TARGET}/dt$, $p_{ACTUAL}/dt$ lies within a threshold range |xs*|.

If the answer to one of the questions is "no", i.e. the deviation xd* lies outside of the threshold range |xs*| or the control deviation xd is greater than the tolerance range value xs, then the correcting variable $I_{TARGET}(n)$ which is output by the control device RO, R in the current cycle is stored as $I_{TARGET}(n-1)$ for the next control cycle, and the correcting variable $I_{TARGET}(n)$ which is output in the current cycle is taken up and output unchanged as new correcting variable $I_{TARGET}^*$.

If the answer to both questions is "yes", i.e. the deviation xd* lies within the tolerance range |xs*| and the control deviation xd is greater than the tolerance range value xs, then the correcting variable $I_{TARGET}(n-1)$ which is stored in the preceding cycle is output as new correcting variable $I_{TARGET}^*$.

As a result of implementing the postprocessor L in this way, the correcting variable $I_{TARGET}$ is maintained constant during time segments in which the deviation xd* of the gradients $p_{TARGET}/dt$, $p_{ACTUAL}/dt$ lies within the tolerance range xs*f. The correcting variable is in this case maintained at the value which was last stored under $I_{TARGET}(n-1)$ in the "NO" interrogation path. In contrast, the correcting variable $I_{TARGET}(n)$ currently output by the control device RO, R remains uninfluenced and is output as $I_{TARGET}^*$ during time segments in which the deviation xd* of the gradients $p_{TARGET}/dt$, $p_{ACTUAL}/dt$ lies outside of the tolerance values |xs*|.

Because the correcting variable is maintained constant over relatively long time segments during control, the actuator, which comprises the electromagnet arrangement 26 and the control valve, which is not represented in detail, is also adjusted less frequently. The substantial reduction in adjustment work affords the important advantage of a particularly convenient control procedure overall with respect to noise development, for the control valve remains in a certain control or open position during the constant phases of the correcting variable. Related to the vehicle brake system, this results in a particularly harmonious or low-noise brake pressure variation.

It is obvious that an averaging process over several preceding values can also be carried out when storing the correcting variable under $I_{TARGET}(n-1)$, providing the possibility of compensating for individual "mavericks" which could have adverse effects on the control performance. It is also obvious that the range of the tolerance value |xs*| and/or the tolerance range value |xs|, with which the control deviation xd is compared, can be controlled in adaptive fashion before or during the control procedure in order to adapt the response behaviour of the postprocessor L to different operating points of the electronically controllable brake booster.

Figure 5:
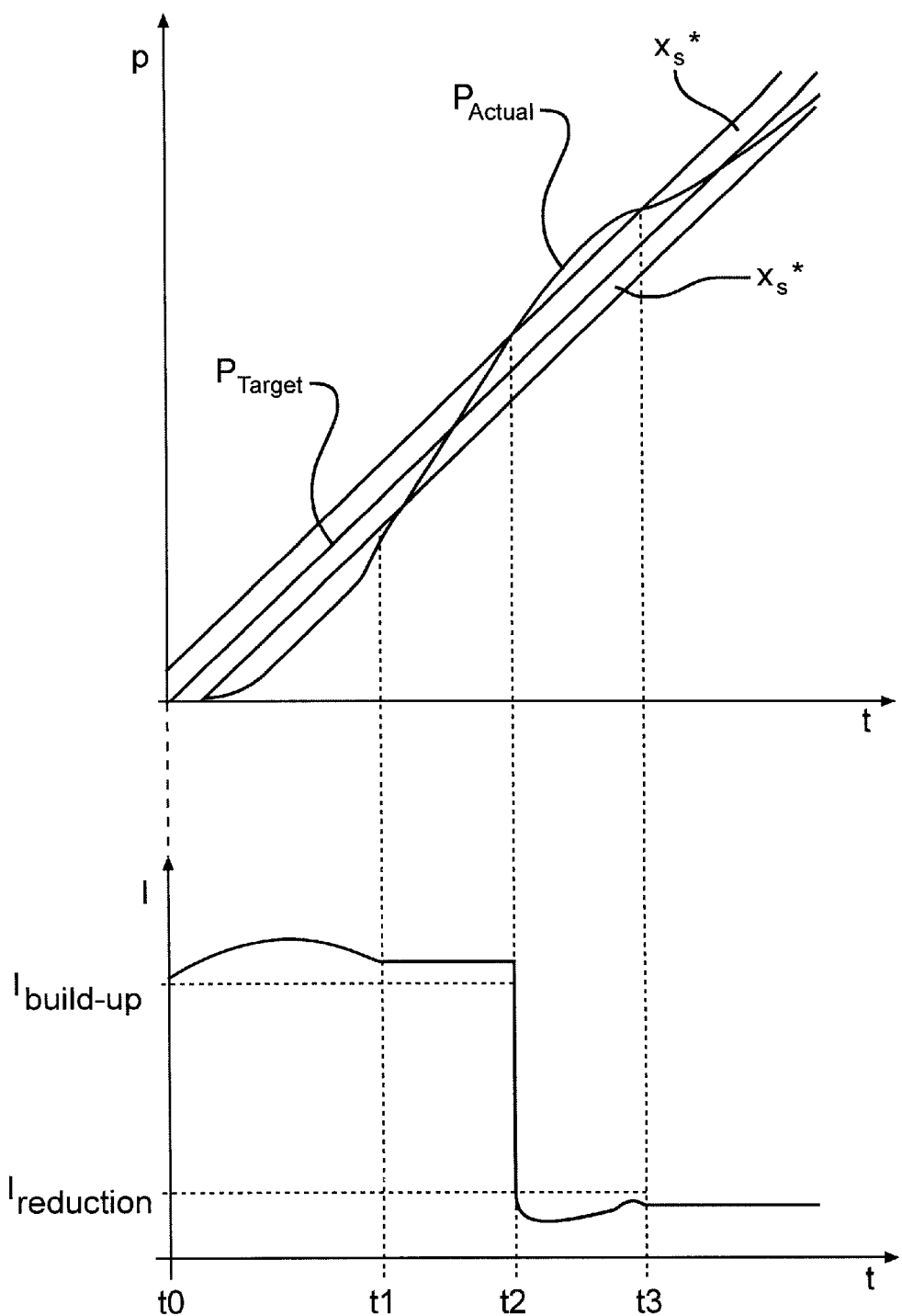
FIG. 5 shows in schematic form two time graphs for illustrating the operation according to the invention of an electronically controllable brake booster.

The operation according to the invention is illustrated in FIG. 5 on the basis of two time graphs. The variation in time of the command variable $p_{TARGET}$ and the controlled variable $p_{ACTUAL}$ is represented in the top time graph, while the variation in time of the correcting variable $I_{TARGET}$ is represented in the bottom time graph. The command variable $p_{TARGET}$ is increased like a ramp from the instant t0, and the correcting variable $I_{TARGET}$ assumes the build-up current $I_{BUILD-UP}$ instantaneously at the instant t0 in order to control the controlled variable $p_{ACTUAL}$.

The controlled variable $p_{ACTUAL}$ extends below the command variable $p_{TARGET}$ in the time segment 0-t1. The deviation xd* of the gradients $p_{TARGET}$/dt, $p_{ACTUAL}$/dt lies within the tolerance value |xs*| from the instant t1, so that the correcting variable $I_{TARGET}$ is maintained constant in the time segment t1-t2. At the instant t2 the deviation xd* of the gradients $p_{TARGET}$/dt, $p_{ACTUAL}$/dt or xd/dt comes to lie outside of the tolerance value |xs*|, so that the control process recommences with the correcting variable $I_{TARGET}$ assuming the reduction current $I_{REDUCTION}$ instantaneously in order to control the controlled variable $p_{ACTUAL}$. The controlled variable $p_{ACTUAL}$ extends above the command variable $p_{TARGET}$ in the time segment t2-t3 until the deviation xd* of the gradients $p_{TARGET}$/dt, $p_{ACTUAL}$/dt or xd/dt again lies within the tolerance value |xs*| at the instant t3, so that the correcting variable $I_{TARGET}$ is maintained constant again from the instant t3. The correcting variable $I_{TARGET}$ is not maintained constant during the time segments t0-t1 and t2-t3, although the deviation xd* of the gradients of the control difference is almost zero in some instances. This is due to the fact that the control deviation xd is greater than its tolerance value xs during the time segments t0-t1 and t2-t3, as has already been illustrated on the basis of FIG. 4.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A electronically controlled brake booster comprising:
    a vacuum chamber and a pressure chamber separated from one another by a movable wall;
    a control valve actuated by an electromagnetic actuating device, for controlling a pressure difference between the pressure and vacuum chambers, and having a holding position, a pressure build-up position and a pressure reducing position depending on current flowing through the electromagnetic actuating device;
    a piston, connected to the brake booster, in a hydraulic cylinder hydraulically connected to a wheel brake;
    a sensor generating a pressure signal correlated with a pressure in the hydraulic cylinder, at a time where the pressure is set by a current flowing through the electromagnetic actuating device determined by a previous correcting variable;
    an electronic control unit calculating a command variable based on a sensor output detecting a driver's braking requirement, calculating a control difference as a function of a difference between the pressure signal and the command variable, comparing the control difference with a first predetermined tolerance range, calculating a derivative of the control difference, comparing the derivative of the control difference with a second predetermined tolerance range, generating a future correcting variable based on the outcome of the comparisons and controlling the current flowing through the electromagnetic device based on the future correcting variable,
    wherein the future correcting variable is generated such that it remains unchanged, compared to the previous correcting variable, if the control difference is within said first predetermined tolerance range, and if the derivative of the control difference is within said second predetermined tolerance range.

2. An electronically controlled brake booster according to claim 1, wherein the future correcting variable remains unchanged, compared to the previous correcting variable, if an intermediate variable is within a third predetermined tolerance range, wherein the intermediate variable is a function of a derivative of the command variable and derivative of the pressure signal.

3. An electronically controlled brake booster according to claim 1, wherein when correcting variable is a first value, the control valve is moved to the pressure build-up position, where a connection between the vacuum chamber and the pressure chamber is closed and a connection between the pressure chamber and atmosphere is open, so that a pressure difference acting on the movable wall is increased;
    when the correcting variable is a second value, the control valve is moved to the pressure holding position, where a connection between the vacuum chamber and the pressure chamber is closed and a connection between the pressure chamber and atmosphere is closed, so that a pressure difference acting on the movable wall is maintained; and when the correcting variable is a third value, the control valve is moved to the pressure reduction position, where a connection between the vacuum chamber and the pressure chamber is open and a connection between the pressure chamber and atmosphere is closed, so that a pressure difference acting on the movable wall is decreased, by a pressure equalization procedure.

4. An electronically controlled brake booster according to claim 3, wherein the correcting variable is the first value, when the command variable is greater than the pressure signal; the correcting variable is the second value, when the command variable is substantially equal to the pressure signal; and the correcting variable is the third value, when the command variable is less than the pressure signal.

5. An electronically controlled brake booster according to claim 1, wherein there is an additional controller generating an auxiliary correcting variable as a function of the control difference; wherein the auxiliary correcting variable is added into the future correcting variable; and wherein the additional controller is a proportional controller and/or an integral controller and/or a differential controller.

6. An electronically controlled brake booster according to claim 5, wherein a linear transmission member, with a dead zone, is connected to the additional controller; such that the linear transmission member generates a linear transmission variable as a function of the control difference; and the additional controller generates the auxiliary correcting variable as a function of the linear transmission variable.

7. An electronically controlled brake booster comprising:
    a vacuum chamber and a pressure chamber separated from one another by a movable wall;
    a control valve actuated by electromagnetic actuating device, for controlling a pressure difference between the pressure and vacuum chambers, and having a holding position, a pressure build-up position and a pressure reducing position depending on current flowing through the electromagnetic actuating device;
    a piston, connected to the brake booster, in a hydraulic cylinder hydraulically connected to a wheel brake;
    a sensor generating a pressure signal correlated with a pressure in the hydraulic cylinder, at a time where the pressure is set by a current flowing through the electromagnetic actuating device determined by a previous correcting variable;

an electronic control unit generating a command variable based on a sensor output detecting a driver's braking requirement, generating a control difference as a function of a difference between the pressure signal and the command variable, and generating a future correcting variable which determines the current flowing through the electromagnetic actuating device;

wherein the future correcting variable remains unchanged, compared to the previous correcting variable, if the control difference is within a first predetermined tolerance range, and if a derivative of the control difference is within a second predetermined tolerance range; wherein there is an additional controller generating an auxiliary correcting variable as a function of the control difference; wherein the auxiliary correcting variable is added into the future correcting variable; and wherein the additional controller is a proportional controller and/or an integral controller and/or a differential controller.

8. An electronically controlled brake booster comprising:

a vacuum chamber and a pressure chamber separated from one another by a movable wall;

a control valve actuated by electromagnetic actuating device, for controlling a pressure difference between the pressure and vacuum chambers, and having a holding position, a pressure build-up position and a pressure reducing position depending on current flowing through the electromagnetic actuating device;

a piston, connected to the brake booster, in a hydraulic cylinder hydraulically connected to a wheel brake;

a sensor generating a pressure signal correlated with a pressure in the hydraulic cylinder, at a time where the pressure is set by a current flowing through the electromagnetic actuating device determined by a previous correcting variable;

an electronic control unit generating a command variable based on a sensor output detecting a driver's braking requirement, generating a control difference as a function of a difference between the pressure signal and the command variable, and generating a future correcting variable which determines the current flowing through the electromagnetic actuating device;

wherein the future correcting variable remains unchanged, compared to the previous correcting variable, if the control difference is within a first predetermined tolerance range, and if a derivative of the control difference is within a second predetermined tolerance range;

wherein a linear transmission member, with a dead zone, is connected to the additional controller; such that the linear transmission member generates a linear transmission variable as a function of the control difference; and the additional controller generates the auxiliary correcting variable as a function of the linear transmission variable.

* * * * *